US012652500B1

(12) United States Patent
Bhandari

(10) Patent No.: US 12,652,500 B1
(45) Date of Patent: Jun. 9, 2026

(54) MICRO-SPEAKER WITH INTEGRATED MICROPHONE AND SYSTEM

(71) Applicant: Vibrant Microsystems Inc., Cupertino, CA (US)

(72) Inventor: Sanjay Bhandari, Cupertino, CA (US)

(73) Assignee: Vibrant Microsystems Inc., Cupertino, CA (US)

( * ) Notice: Subject to any disclaimer, the term of this patent is extended or adjusted under 35 U.S.C. 154(b) by 191 days.

(21) Appl. No.: 18/529,205

(22) Filed: Dec. 5, 2023

Related U.S. Application Data

(60) Provisional application No. 63/386,096, filed on Dec. 5, 2022.

(51) Int. Cl.

| | |
|---|---|
| ***H04R 19/02*** | (2006.01) |
| ***H04R 1/02*** | (2006.01) |
| ***H04R 1/10*** | (2006.01) |
| ***H04R 3/06*** | (2006.01) |
| ***H04R 7/06*** | (2006.01) |
| ***H04R 19/04*** | (2006.01) |
| ***H04R 29/00*** | (2006.01) |

(52) U.S. Cl.
CPC ............. *H04R 19/02* (2013.01); *H04R 1/025* (2013.01); *H04R 1/1016* (2013.01); *H04R 3/06* (2013.01); *H04R 7/06* (2013.01); *H04R 19/04* (2013.01); *H04R 29/001* (2013.01); *H04R 2201/003* (2013.01); *H04R 2460/11* (2013.01)

(58) Field of Classification Search
CPC ..... B81B 7/0006; H03F 1/0211; H03G 11/02; H04R 1/025; H04R 1/1016; H04R 3/002; H04R 3/06; H04R 7/06; H04R 19/02; H04R 19/04; H04R 29/00; H04R 29/001; H04R 2201/003; H04R 2460/11
See application file for complete search history.

(56) References Cited

U.S. PATENT DOCUMENTS

| | | | | |
|---|---|---|---|---|
| 5,319,714 | A * | 6/1994 | McTaggart | H04R 29/001 381/59 |
| 6,931,135 | B1 * | 8/2005 | Kohut | H03G 11/02 381/100 |
| 7,058,186 | B2 * | 6/2006 | Tanaka | H04R 3/002 381/59 |
| 12,515,943 | B2 * | 1/2026 | Doll | B81B 7/0006 |
| 2001/0003166 | A1 * | 6/2001 | Gulick | H03F 1/0211 381/59 |

(Continued)

*Primary Examiner* — Carolyn R Edwards
(74) *Attorney, Agent, or Firm* — Ogawa P.C.

(57) ABSTRACT

A system includes a microphone having a diaphragm disposed over an electrode on a substrate, coupled to the substrate by a spring, and having a cap layer with a cavity and a vent hole disposed over the diaphragm, wherein the diaphragm moves and changes capacitance with respect to the electrode in response to sound pressure, a speaker having another diaphragm disposed over another electrode on the substrate, coupled to the substrate by another spring, and having another cap layer with another cavity and another vent hole disposed over the other diaphragm, wherein the other diaphragm moves with respect to the other electrode in response to driving signals applied between the other diaphragm and the other electrode, and a CMOS substrate coupled the substrate, to the speaker and microphone, and configured to process the changes in capacitance and configured to provide the driving signals.

20 Claims, 4 Drawing Sheets

(56) References Cited

U.S. PATENT DOCUMENTS

| | | | | |
|---|---|---|---|---|
| 2006/0050891 | A1* | 3/2006 | Bharitkar | H04R 29/001 381/59 |
| 2011/0299691 | A1* | 12/2011 | Yoshino | H04R 29/00 381/59 |

* cited by examiner

MICRO-SPEAKER WITH INTEGRATED MICROPHONE AND SYSTEM

CROSS-REFERENCE TO RELATED APPLICATIONS

The present invention claims priority to and is a non-provisional of U.S. Pat. App. No. 63/386,096 filed Dec. 5, 2022. The present invention is also related to U.S. patent application Ser. No. 18/354,432 filed Jul. 18, 2023, U.S. patent application Ser. No. 18/451,504 filed Aug. 17, 2023, and U.S. Pat. App. No. 63/597,989 filed Nov. 10, 2023. These applications are incorporated by reference herein for all purposes.

BACKGROUND OF INVENTION

The present invention is directed to micro electro-mechanical systems, commonly termed "MEMS." In particular, the present invention provides a semiconductor foundry-compatible process to fabricate devices such as a MEMS speaker device and a MEMS microphone device, separately or on a common substrate. Although the invention has been described in terms of specific examples, it will be recognized that the invention has a much broader range of applicability.

Loudspeakers, also referred to as speaker drivers or speakers, are electro-acoustic transducers that convert electric signals to the movement of air. Speakers are an essential part of many consumer gadgets such as home music systems, smart watches or wearables, smartphones, laptops, tablets, earbuds, among others. As the thicknesses of mobile devices decrease, speakers have also become smaller in size. Currently, loud speakers refer to a speaker with greater than 4-inch diameter, mini speakers refer to a speaker with a 2-4 inch diameter, and micro speakers refer to speakers with a diameter less than 2-inches. Recently with the popularity of ear buds, the size of the speakers has decreased to less than 1-inch diameter.

Most conventional speakers are still designed with conventional technologies that include a thin moving diaphragm of paper, plastic, or similar material, and spring element which is actuated by electromagnetic signals that are proportional to an audio signal input to the speaker. Conventional speakers typically use a permanent magnet to generate a magnetic field in which a moving coil (driven with electrical signals) generates transient electromagnetic forces. Conventional speakers are incompatible with conventional surface mount printed circuit board (PCB) technology which is a disadvantage in the manufacturing flow for original equipment manufacturers (OEM) of electronic systems. Additionally, conventional speaker technology creates additional constraints on the placement of speakers inside smartphones, as an example, as magnets may adversely affect other components in the smartphone such as magnetic sensors and the like. These and other limitations prevent conventional speakers and related technologies from being used in many consumer devices.

In contrast to speakers, microphones have typically been built using different technologies. In some cases, microphones have utilized condenser/capacitance technology, electret condenser technology, MEMS technology among others. As such, the inventors of the present invention believe the integration of microphones and speakers in a monolithic device has not been considered or developed.

In light of the above, what is desired are semiconductor fabrication-compatible methods for manufacturing microphones, speakers, and integrated devices, and devices themselves.

SUMMARY OF INVENTION

The present invention is directed to MEMS (Micro Electro Mechanical Systems) system on a chip. More specifically, embodiments of the invention provide structures for designing, implementing and fabricating a MEMS Speaker, MEMS microphone as well as other MEMS actuators and sensors and integrated CMOS processing in the same die. It will be recognized that the invention has a much broader range of applicability.

In an example, the present invention provides a foundry compatible process for fabricating a micro-speaker and a microphone device. The device typically has a cap device comprising a plurality of vent regions for propagating acoustic signals. The cap device can be made of a suitable material such as silicon, or other rigid substrate capable of being processed using semiconductor techniques. In an example, the device has a CMOS (i.e., Complementary metal—oxide—semiconductor) device coupled to the cap device. In an example, the CMOS device comprises at least one vent region (although there may be more) configured to allow backpressure to flow therethrough. The CMOS device can be a CMOS semiconductor substrate, including a plurality of CMOS cells. The device has a cavity region configured between an interior surface of the cap device and a CMOS device interior surface of the CMOS device. The device has a frame device coupled between the cap device and the CMOS device to form an exterior housing for the cavity region. An example, the frame device can be configured on either or both of the cap device and/or the CMOS device or integral with either or both devices.

In an example, the device has a movable diaphragm device comprising a thickness of silicon material having a thickness 0.1 nm to ten microns, and configured spatially in an elongated manner within the cavity region. In an example, the movable diaphragm device has a first surface and a second surface opposite of the first surface. In an example, the movable diaphragm is connected with at least two cantilever or springs. Each of the cantilever or springs being coupled between a peripheral region of the movable diagram device and a portion of a frame configured surrounding the movable diaphragm device.

In an example, the device has a CMOS electrode device configured on the CMOS device interior region. That is, the CMOS device has an electrode device or devices formed on an interior region of the CMOS device. In some embodiments, the CMOS device includes circuitry for the speaker and/or microphone.

Depending upon the example, the present invention can achieve one or more of these benefits and/or advantages. Various embodiments provides a device having a MEMS Micro-speaker and a MEMS Microphone, with reduced size and profile without affecting the performance. In some embodiments CMOS audio processing devices on a CMOS substrate may monolithically formed together with the MEMS devices, thereby miniaturizing the whole audio chain for demanding components such as ear buds, hearables, smartwatches and smart phones. In an example, various embodiments can be implemented using conventional semiconductor and MEMS process technologies for wide scale commercialization. These and other benefits and/or advantages are achievable with the present device and related methods. Further details of these benefits and/or advantages can be found throughout the present specification and more particularly below.

BRIEF DESCRIPTION OF FIGURES

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

According to various embodiments, an integrated micro-speaker and microphone using Micro Electro Mechanical Systems "MEMS" are provided. In particular, some embodiments of the present invention disclose one or more MEMS speaker devices and one or more MEMS microphone devices on a single substrate or die. In some embodiments, the die is a CMOS die and may include one or more active devices that may drive the MEMS devices, may sense data from the MEMS devices, and may process the sensed MEMS data. The terminology micro-speaker and speaker has been interchangeably used with both implying a device that can generate sound wave. Although the invention has been described in terms of specific examples, it will be recognized that the invention has a much broader range of applicability.

Figure 1:
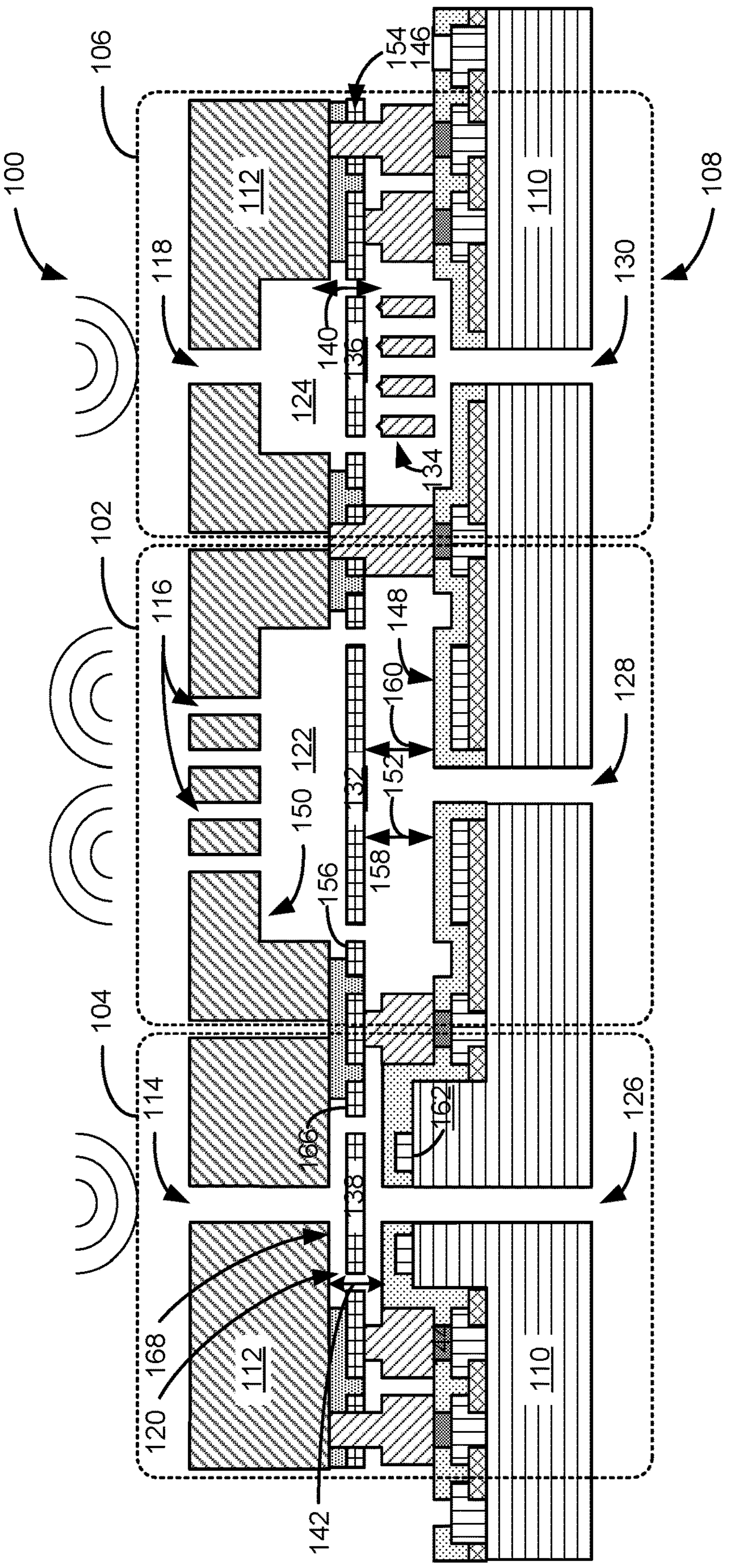
FIG. 1 is a cross-section diagram of some embodiments.

FIG. 1 is a simplified diagram showing a cross-sectional view 100 of the MEMS Micro-speaker 102 with Microphones 104 and 106 and system on a chip 108 in various embodiments. In some embodiments, a CMOS die 110 forms the bottom layer of the integrated Micro-speaker 102 and microphone(s) 104 and 106. CMOS die 110 may include circuits for processing audio signals (e.g. processor), circuits for actuation and sensing of signals from one or more MEMS micro-speaker 102, circuits for electronic damping, and the like. In some examples, CMOS die 110 may also include circuits for sensing microphones 104 and 106, as well as circuitry for processing the received microphone signals. In some examples, CMOS die may also include circuitry, including some that performs Active Noise Cancelation (ANC) functions, some that facilitates wireless communication (e.g. Bluetooth communication to receive the audio signals), some that determines user biometric data based upon various audio signals, and the like. In addition in some examples, other types of circuitry that may be included or coupled to CMOS die 110 may include MEMS accelerometers or gyroscopes, pressure sensors, temperature sensors, magnetometers, or the like.

As illustrated in the embodiment in FIG. 1, a cap layer 112 is disclosed, that includes multiple vent holes, 114, 116, and 118 into cavities 120, 122, and 124. Additionally, CMOS die 110 may also include multiple vent holes 126, 128, and 130 into cavities 120, 122, and 124. In various embodiments, vent holes 116 and 128 allow for the output of air pressure/sound signals that are produced by micro-speaker 102 from cavity 122. Additionally, in some embodiments, vent holes 114 and 126 (118 and 130) allow for the input of air pressure from external sources to enter cavity 122 (124) to be sensed by microphones 104 and 106.

In various embodiments, CMOS die 110 may include one or more metal layers, e.g. 126. In this example, part of the top metal layer 126 may be used as electrostatic actuator (e.g. electrode) 148, and may be driven by an electrical signal that may have DC as well as AC components. When driven with the electrical signals actuator 148 generates an electrostatic force 152 on the MEMS layer, which serves as a diaphragm 132 for Micro-speaker 102, to move in an out-of-plane direction.

In some embodiments, cap layer 112 may have additional metal, poly or other electrically conductive electrode 150 disposed within cavity 122, for example, above diaphragm 132 that operates as an actuation layer with respect to diaphragm 132. In these embodiments, electrical connection may be made via contacts, e.g. 144 to CMOS die 110, or externally via wire bonds, or the like to contacts, e.g. 146.

In various embodiments, CMOS die 110 also includes a metal or poly layer 134 that may be used as capacitive sensor for microphone 106. In operation, as air pressure/sound signals enter cavity 124, the MEMS layer that serves as diaphragms 136 for microphone 106, moves out of plane 140. This movement causes a capacitance change between diaphragms 136 and conductive layer 134. The capacitance change may then be processed electronically to generate an electrical signal proportional to the sound captured by the microphone 106. Sensing for microphone 104 is discussed below.

In various embodiments, a MEMS layer 154 is shown patterned with multiple diaphragms, e.g. 132, 136 and 138 in FIG. 1. Diaphragms 132, 136 and 138 or pistons are designed to have up and down motion, e.g. towards away from the CMOS die 110. Since diaphragm motion is up and down and not laterally, it is considered out-of-plane motion. In various embodiments, diaphragms (132, 136 and 138) may be surrounded by a frame or anchor, e.g. 156, and coupled there to by using springs, beams or levers 158 also typically monolithically formed from MEMS layer 154. In the cross-section of FIG. 1 gaps are shown where portions of springs, such as 158, are not cross-sectioned. It should be understood that springs couple the diaphragms to frames (e.g. 156) and MEMS layer 154 using conventional MEMS spring configurations. In some embodiments these often S-shaped springs may have cantilever action and or torsional force or a combination of both forces. As mentioned, the MEMS region, e.g. diaphragm 132 directly above metal actuator electrode 148 will move vertically and out-of-plane due to the electrostatic force 152. In some cases, force 152 will attract the MEMS actuator (diaphragm 132), pulling it closer to the actuating surface (e.g. towards CMOS die 110). In some cases springs 158 provides restoring force to diaphragm 132 that forces diaphragm 132 to its original position due to tension in spring 158.

In various embodiments, the spring constant (e.g. restoring force), the area of diaphragm 132 and the mass of diaphragm 132 may be carefully designed to balance resonance of the MEMS (e.g. diaphragm 132) against performance. In particular, at a resonant frequency, the movement of diaphragm 132 may be increased or maximized thus increasing air pressure, however, this may be balanced against the physical characteristic of diaphragm 132 (e.g. dimensions and mass) which are modified to obtain a flatter frequency response for a desired frequency bandwidth.

As can be seen in FIG. 1, there is a gap 160 between moving MEMS element (diaphragm 132) in the actuation area and the metal actuation layer (e.g. electrode 148). In some embodiments, a smaller gap 160 may provide greater electrostatic forces than a larger gap, however, this may limit the displacement of diaphragm 132 and thus the amount of air pressure that is output. Accordingly, actuator gap 160 is designed based on the desired amount of movement of the MEMS (e.g. air pressure/sound volume), the desired strength of the electrostatic forces (e.g. 152), the damping forces (e.g. spring 158 restoring force), and the like.

As mentioned above, cap layer 112 is provided and may be a silicon wafer with cavities (120, 122, and 124) to allow movement of the diaphragms (e.g. 120, 122, 124). As discussed, cap layer 112 may have openings 118 and 114 in the areas above diaphragms 136 and 138 where sound pressure, typically from external sources may enter cavities 120 and 12 of microphones 104 and 106.

In some embodiments, cap layer 112 may include regions where contacts (e.g. 144) to CMOS die 110 are formed. In some examples, AlGe or similar bonding processes may be used.

In various embodiments, the MEMS material from which diaphragms 132, 136 and 138, and the like, may be formed using Silicon on Insulator (Sol) processes. In some embodiments, diaphragms can be made of silicon, poly-silicon, graphene or a combination of different materials.

In operation, electrode 148 disposed on the CMOS die 110 and/or electrode 150 disposed on cap wafer 112 overlaying diaphragm 132 may be coupled to a drive circuit and electrically driven by a signal proportional to a desired audio signal. In some embodiments, the gap between diaphragm 132 and electrode 150 is approximately similar to gap 160, although in other embodiments, the distances may be different. In some embodiments, the signal may be out of phase by 180 degrees, such that electrode 148 repels diaphragm 132 while electrode 150 attracts diaphragm 132, or the opposite. In some embodiments, only electrode 150 or only electrode 148 are provided and/or are only driven. As diaphragm 132 moves out-of-plane in response to the forces, e.g. 152, air within cavity 122 is compressed.

The vent holes or perforations 116, discussed above allow this air pressure or sound waves to pass therethrough. In some embodiments, the sizes of vent holes 116 depend upon a tradeoff between too small thus providing resistance to the air flow versus too large allowing particles and contaminants from the atmosphere to enter cavity 122. In some embodiments, vents 116 may not be straight-through holes or channels, but may have one or two bends or turns. Such a maze-like airway paths may help reduce the likelihood of particulate contamination, however these maze-like paths may introduce additional air resistance. To reduce or offset this additional air resistance, in some embodiments, the diameter or cross-section of these holes may be increased. As seen in FIG. 1, vent holes 128 may also be provided within CMOS die 110 to allow air pressure or sound waves to enter or exit cavity 122. In some examples, baffles may be provided to reduce back air pressure from mixing with the front air pressure waves.

FIG. 1 shows an embodiment where the speaker cavity 122 are separated from microphone cavities 120 and 124. In various embodiments, this may be achieved by creating multiple cavities in the cap wafer 112 before it is bonded to MEMS layer 154 and to CMOS die 110. Accordingly, in this example, one cavity is used for speaker and the other cavities are used for the microphones which isolates the laterally traveling sounds waves from the speaker directly affecting microphones. In some embodiments, microphone vent holes 114 and 118 may be separately brought out to a surface of a device, for example through a hole in the ear bud, so that a microphone may sample external noise sources of the earbud and not the sound from the speaker.

Figure 2:
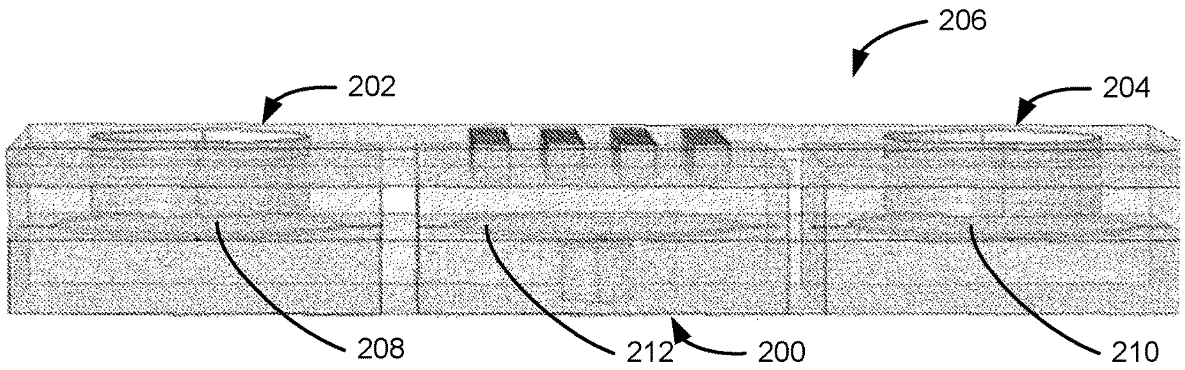
FIG. 2 illustrates a configuration according to some embodiments.

FIG. 2 illustrates a 3-dimensional view of an integrated micro-speaker 200 together with two MEMS microphones (202 and 204) and system 206. In various embodiments, the microphone and speaker diaphragm layers (208, 210 and 212) may be round and will have independent spring, diaphragm optimization. In other embodiments, diaphragm layers 208, 210 and 212 may have other shapes, such as rounded square, rounded rectangle, oval, rounded polygon, or the like. In some embodiments, multiple speakers (e.g. 200) can be provided on system 206, and different speakers may designed with each cell optimized to achieve a certain desired resonance frequency (e.g. high-frequency speaker, mid-frequency speaker, low-frequency speaker, or the like.)

In some embodiments, the microphone regions (202 and 204) may be physically isolated from the speaker portion 200 in order to reduce or avoid interference between the two functions. In other embodiments, multiple microphones may be implemented to provide differential processing of the signal to eliminate the signal of speaker or other disturbances such as noise and or vibrations due to walking motion which becomes common mode to the two microphones.

In the embodiments in FIG. 2, speaker and microphone cavities are separated. This is achieved by creating two or more cavities in the cap wafer before it is fusion or eutectically bonded to the CMOS die. One cavity may be used for speaker and the other cavity(ies) may be used for the microphone(s). This isolates the laterally traveling sounds waves from the speaker directly affecting the microphone. In some examples, the microphone cavity opening can be separately brought out, for example through a hole in the ear bud that opens up outside to sample external noise sources and not the sound from the speaker. As seen in FIG. 1, the cavity heights in the microphone regions (120, 134) can be made same or different compared to the cavity height 122 in the micro-speaker region.

In some embodiments, microphone 202 and 204 in the integrated structure 200 can be used for an active noise cancellation function. For example, two or more microphones may help in isolating noise due to the phase difference of external noise reaching these microphones and in providing feedback signals to the speaker to reduce or cancel out the noise. Specifically, using two or more microphones can help in identifying and isolating the signal of interest (the audio signal from the speaker itself) from the noise due to the phase difference in the two signals, and the speaker may be driven by a signal that cancels out the noise. In some embodiments, the microphones 202 and 204 can be used in either Feedback, feedforward or Hybrid active noise cancellation as illustrated in later illustrations. In various embodiments, microphones 202 and 204 also typically include bottom vent holes.

In another embodiment, additional sensors such as Accelerometers, pressure sensor and temperature sensor can also be added in structure 200. Each of them may use part of the MEMS layer discussed above. In some embodiments, a diaphragm thickness and gap may be changed and optimized relative to the CMOS metal layer, which is used as a sense electrodes for the sensors.

Referring back to FIG. 1, in various embodiments, sensing in the Microphone can be done either from the bottom surface or from the top surface or both. In one embodiment, CMOS die 110 forms the bottom layer of the integrated micro-speaker 116 and microphone 114 and is a common substate as shown in FIG. 1. CMOS die 110 may have electronics for processing of the output audio signals, sensing of the MEMS diaphragm movement, electronic damping and other circuits. Additionally, CMOS die 110 may have sensing circuitry to process the received microphone signal, i.e. displacement of diaphragm 138. In some embodiments, CMOS die 110 may also integrate functionality required for Active Noise Cancelation (ANC), and other processing capabilities discussed herein.

In FIG. 1, the MEMS layer in the microphone 114 includes of diaphragm 138 designed to have up & down motion 142 (towards & away from CMOS die 110, and CMOS metal sense plate 162). The diaphragm is connected to the frame or anchor by using MEMS springs, beams or lever (e.g. 166). The springs may have cantilever action and or torsional force or a combination of both forces. The MEMS region (diaphragm 138) directly above the sensor electrodes 162 will move vertically 142 due to the sound pressure above microphone diaphragm 138. Specifically, this pressure will typically exert a force to push the microphone diaphragm 138, pushing it closer to the metal surface 162. The springs 166 typically provides a restoring force for diaphragm 138 back to its original position, where there is minimal tension in the spring, away from sense plate 162. There is a nominal or default gap or distance between moving MEMS element 138 in the microphone area and the metal sense layer 162. Displacement of diaphragm 138 due to air pressure that results in a smaller gap relative to sense plate 162 typically increases a capacitance between MEMS microphone diaphragm 138 and sense plate 162, compared to a nominal or default capacitance with a larger gap. In various examples, a nominal or default sensor gap is designed based on the desired movement of the MEMS diaphragm 138, the desired limits of the acoustic pressure (e.g. spring stiffness), robustness of the system, and the like.

In various embodiments, the CMOS die 110 will have one or multiple metal layers. In one example, CMOS die 110 will have a metal or poly layer that will be used as capacitive sensor 162 for the microphone. The capacitance change caused by sound pressure at the microphone diaphragm will be processed electronically to generate an electrical signal proportional to the sound captured by the microphone.

In various embodiments, the cap wafer 112 is a silicon wafer with cavity 120 in the area on top of the microphone diaphragm 128 and includes a vent hole opening 114 to expose the microphone diaphragm 138 to sound pressure to allow the microphone diaphragm to move in proportion to the sound pressure. In some examples, the periphery of the cap wafer die may have AlGe or similar deposition 144 to allow bonding with the CMOS wafer 110.

In some embodiments, the cap wafer 120 may utilize Silicon on Insulator (SOI) fabrication, when the outer surface needs to be isolated from the audio voltages. In some embodiment of microphone 104 shown in FIG. 1, the cap wafer 112 may have additional metal, poly or other electrically conductive deposition on its inner surface 168 facing the diaphragm 138 forming a sense electrode layer that operates as a sense layer relative to diaphragm 138 from the cap or a metal electrode on cap wafer 112. In such examples, the MEMS diaphragm 138 may be characterized two capacitances. Capacitor C1 is capacitance between silicon diaphragm 138 and the inner surface 168 of the cap layer 112, and capacitor C2 is capacitance between silicon diaphragm 138 and sense electrode 162 on the substrate such as top metal layer of the CMOS die 110. In some embodiments C1 and C1 are approximately equal, or have a known or measurable difference.

In operation, when diaphragm 138 moves downward 142 due to sound pressure, the capacitance C1 decreases due to increased gap between cap layer 112 to diaphragm 138 whereas the capacitor C2 increases due to reduced gap between diaphragm 138 and the electrode 162 on the substrate. In some embodiments, the capacitors C1 and C2 may be made equal at the initial position of the diaphragm 138 without any sound pressure. Then, when the diaphragm moves up or down 142 with the sound pressure, C1 and C2 will change in the opposite direction i.e. C1 decreases when C2 increases and vice versa. The electronic circuit on the CMOS die 110 generates an electrical signal based on the difference between C1 and C2 as the diaphragm moves. A differential amplifier, a switched capacitor based difference amplifier, a charge sensing amplifier, or the like may be used to process the change of capacitances with the sound pressure.

As was illustrated in FIG. 1, cap wafer 112 will have a one 112 or more vent holes in order to allow air pressure or sound waves to pass freely through it. A vent hole 126 with a n area equal to the area of the vent hole 114 will also be typically cut out from CMOS die 110 so that the area of the conductive metal on the inner surface 168 of the cap layer 112 and the metal area 162 on the substrate 110 are approximately equal. This allows the value of C1 to be approximately equal to C2 at the default, nominal, or resting stage of the diaphragm 138 without sound pressure. In some embodiments, an electronic circuit may implement a calibration scheme to compensate for any small difference between C1 & C2 at the quiescent state through a calibration scheme.

FIG. 1 illustrates another embodiment of microphone implementation. In some embodiments, only one surface, either conductive metal 162 or 134 deposited upon CMOS substrate 110 or the conductive surface of the inner surface 168 of the cap wafer 110, may be used. Along with the moving diaphragm 136 or 138, the conductive material forms the sensing capacitor. As an example, in microphone 106, as sound pressure enters cavity 124 through vent e.g. 118, diaphragm 136 may be moved 140 relative to conductive material 134. As it moves, the capacitance between diaphragm 136 and conductive material 134 changes relative to a default or nominal capacitance.

In some embodiments, a 'dummy microphone' may be provided on device 100, where there is no vent in the cap layer above the MEMS microphone diaphragm. If such cases, a gap between MEMS diaphragm and the sense plate and the diaphragm area for the dummy microphone may be similar to microphone 106. Accordingly, wherein there is no sound pressure, the capacitance of the dummy microphone may be substantially similar or equal to the capacitance of microphone 106, when there is no sound pressure. Then, when sound pressure is applied, diaphragm in microphone 106 will move with sound pressure thereby the capacitance may change from C0 to C1, whereas the capacitance dummy microphone should remain C0. Since the dummy microphone is not affected by sound pressure, the capacitance is also not affected. In various examples, the difference between C1 and C0 may be processed in the CMOS circuits using a differential amplifier, switched capacitor difference amplifier or similar circuit to measure the output of the microphone 106. In some embodiments, the capacitance of the dummy microphone and the default or nominal capacitance of microphone 106 may not be similar, and the relative relationship between them may still be used to determine the arriving sound pressure. More particularly, any small differences in the initial mismatch of the capacitances without sound pressure can be calibrated out in the electrical circuits or processing.

Figure 3:
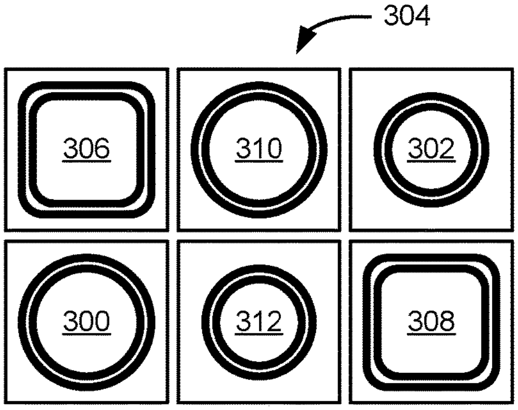
FIG. 3 illustrates a top view according to various embodiments.

FIG. 3 shows a speaker array where multiple such speakers cells are placed next to each other together with multiple microphones on a substrate. In some embodiments, different speaker cells may have different characteristics, for example, a speaker cell 300 can have a resonance frequency at frequency F1, speaker cell 302 at frequency F2 and so on. The resultant frequency response of the combined system 304 can be optimized to achieve an overall wide band frequency response (e.g. flat band) for system 300 or have a boost in the frequency band of interest (e.g. bass boosted). In some embodiments, by placing speaker cells, e.g. 306 and 308, in specific locations, the system 304 may have phased array capability. More particular, by application of signals to the array of speakers, the peak sound amplitude and frequency for system 304 can be directed at different spatial points in the ear. This may be used to enable or increase features of system 304, such as the soundstage, to enable holographic sound, and the like.

In various embodiments, multiple microphones such as 310 and 312 can be used for different methods of active noise cancellation, different frequency capture, beam forming, and the like as discussed herein. In some embodiments, microphones may also enable many different types of biometric characteristics of the user, such as blood pressure, heart rate, hearing response (e.g. otoacoustic emissions (OAEs)), and the like.

Figure 4:
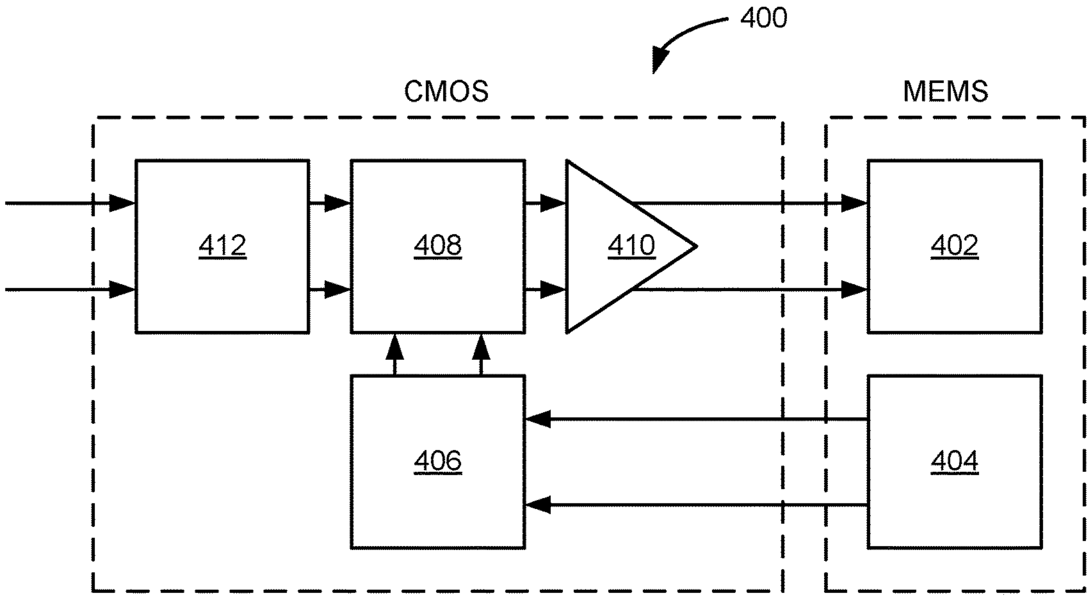
FIG. 4 illustrates a block diagram of various embodiments.

FIG. 4 shows CMOS ASIC 400 that is monolithically integrated with the MEMS Micro speakers 402 and MEMS Microphones 404. In various embodiments, ASIC 400 may have audio pre-processing, including Active Noise Cancellation (ANC). In particular, signals from capacitive MEMS Microphones 402 are processed through audio amplifier 406 and fed to an ANC audio processing block 408. In some embodiments, in addition to ANC, the pre-processing may optimize the signal receiving block 412 fed to the speaker 402 (actuator) in order to pre-compensate for non-linearity of the MEMS, pre-distortion and pre-equalization to compensate for the MEMS effects. The pre-processing can also generate user-specified or default equalizing signals for Micro-speakers 402 as shown. A driver block 410 provides the processed signals to micro-speakers 402. In addition, in some embodiments where there are multiple speaker cells in the array, a 'depth of sound' effect can also be generated by pre-processing the audio in ASIC 400. For example, the different instruments may be "placed" in certain soundstage locations, and the like. In some embodiments, the CMOS ASIC 400 can integrate functionality of wireless communication such as Bluetooth, ultrawide bandwidth (UBC) communication, or the like. It can also integrate functionality of Active Noise Cancellation (ANC) that can be used when the Micro speaker is used in earbud or similar applications.

Figure 5:
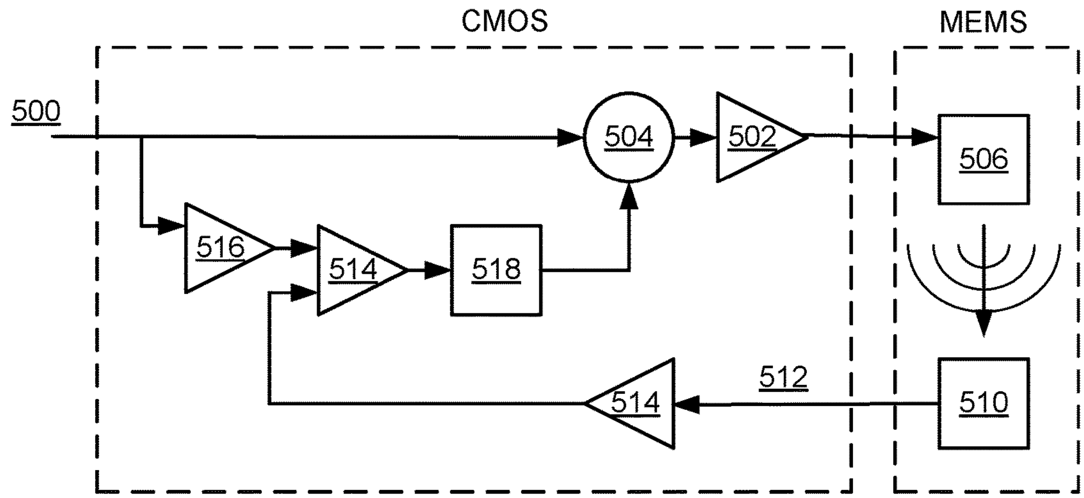
FIG. 5 illustrates a block diagram of various embodiments.

FIG. 5 illustrates an embodiment of how the integrated microphone and micro-speaker system described in this invention can be used for improving linearity of the micro-speaker. In FIG. 5 an audio signal 500 is fed to a driver 502 via a summing amplifier 504 which further drives the micro-speaker 506. In various examples, acoustic signal 500 will have the original audio signal component with some non-ideal components such as harmonic distortion which may be produced by the audio path prior to being input into the micro speaker 506. In various embodiments, the sound 508 produced by the micro-speaker 506 is captured through the microphone 510 integrated with the micro-speaker as described by various embodiments. The signal 512 captured through the microphone 510 is amplified through an amplifier 514 with gain Km and passed through a differential amplifier 514 which compares and produces difference of captured signal 512 and the original audio signal 500, that is amplified by amplifier 516, to isolate the distortion components, further amplifier by loop gain of KL. In operation, the amplified difference signal 514, typically opposite in phase to the distortion component, is then passed through compensation filter 518 and summed together with the audio signal 500. As can be seen, by using the integrated microphone 510 to capture the sound signal and using a feedback mechanism can be used to reduce the harmonic distortion of the micro-speaker and in the audio path.

Figure 6:
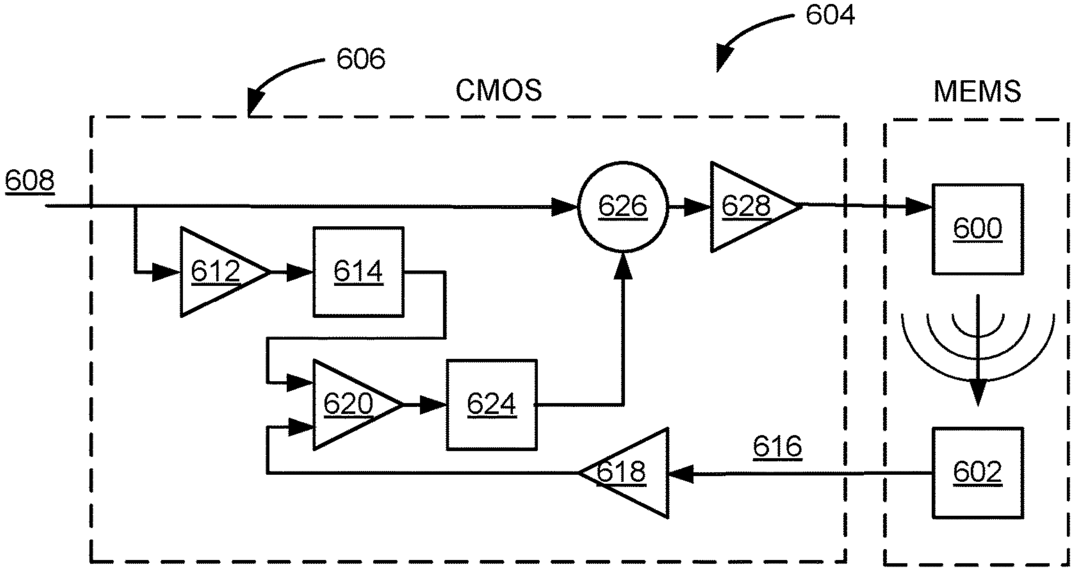
FIG. 6 illustrates a block diagram of various embodiments.

FIG. 6 illustrates an example embodiment of feedback including Active Noise cancellation using the integrated MEMS micro-speaker and MEMS microphone monolithically integrated with CMOS components. In some embodiments, the right side of FIG. 6 shows MEMS elements viz micro-speaker 600 and microphone 602, both of which will be in ear canal of a user when the integrated system 604 is used in an in-ear earbud application. The on-chip MEMS microphone 602 interfaces ear canal and can capture the acoustic signal in the form of sound pressure generated by the micro-speaker 600 plus unwanted ambient noise that enters ear cavity in an ear bud application. Typically, the microphone 602 may also capture any non-idealities such as harmonic distortion of the sound produced by the micro-speaker 600. Additional circuit blocks 606 are included in various embodiments and may include mi-speaker 600 drivers, microphone 602 processing circuitry, and other functionality which may be included implemented in the integrated CMOS device.

In one example, the input Audio signal 608 fed to the system 610 is processed through Audio amplifier 612 with gain Ka and a programmable equalization filter 614. The signal 616 captured through microphone 602 is amplified with audio amplifier 618 with gain Km. This signal will typically have both desired audio signal in addition to noise and non-linear components. At a difference amplifier 620, this signal is compared with the incoming audio signal to isolate the difference which may include ambient noise & distortion components of the micro-speaker 600. These components are passed through amplification, KL and compensation filter 624 and added via summer 626. These typically are opposite in phase to the captured non-idealities to the audio signal 616 to drive (via a driver 628) the MEMS micro-speaker 600. In various examples, the closed loop system minimizes or reduces the distortion components generated within the system and external ambient noise that reaches the ear canal in an ear bud application, hearing aid application, and the like.

Figure 7:
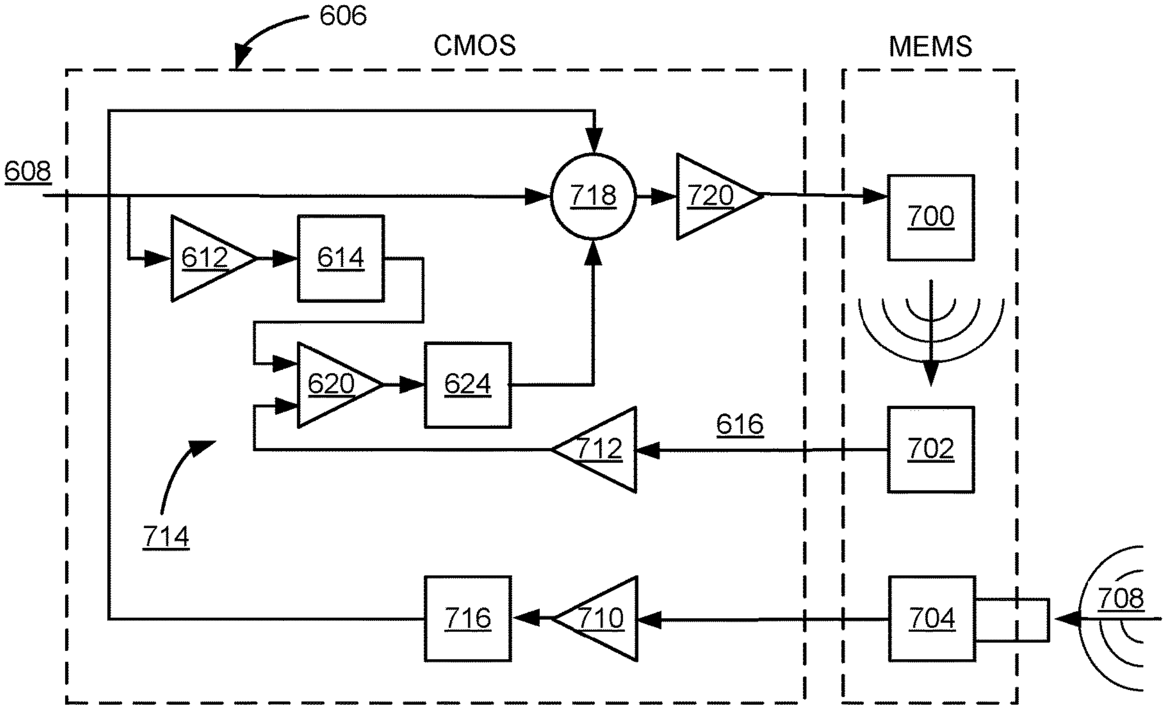
FIG. 7 illustrates a block diagram of various embodiments.

FIG. 7 illustrates an example embodiment of Hybrid Active Noise cancellation using the integrated MEMS micro-speaker and two MEMS microphones monolithically integrated with CMOS. The right side of FIG. 7 includes MEMS elements viz micro-speaker 700 and the two or more microphones 702 and 704. One of the microphone 702 may face the ear canal of the user and its output 706 may be used to implement Feedback ANC as discussed in FIG. 5. The second MEMS microphone 704 may have an acoustic cavity 708 directed outside the ear canal with appropriate acoustic opening in the chip & ear bud. In such embodiments, the second MEMS microphone 704 may capture external noise from the environment around the user, e.g. person, wearing the earbud. Both the microphone signals are fed to respective audio amplifiers 710 and 712. The feedback loop 714 is similar to that illustrated in FIG. 6. The feedforward noise cancellation passes the external ambient noise through an equalization filter 716 and then the processed signal is fed to the summing amplifier 718. In this example, a driver stage 720 amplifies this signal and generates appropriate voltage signals to drive MEMS micro-speaker 700.

Figure 8A:
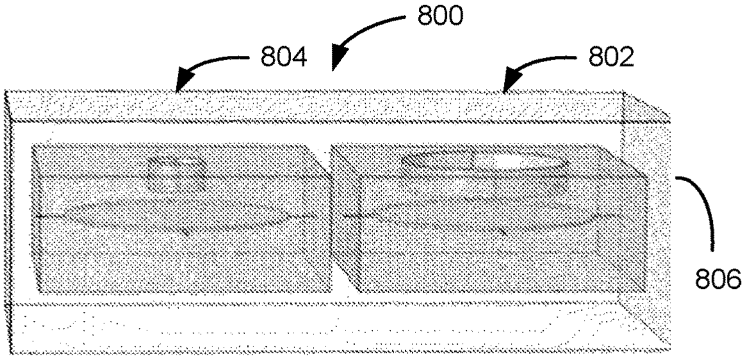
FIGS. 8A-8B illustrate a test configuration of various embodiments.
Figure 8B:
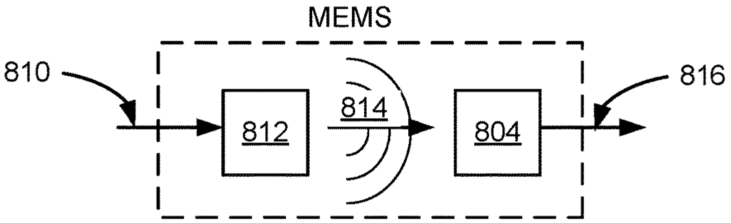

FIGS. 8A-8B illustrate various test configurations. Specifically, FIG. 8A illustrates a three-dimensional view of a system 800 to efficiently test a micro-speaker 802 and microphone 804. In this example, speaker 802, microphone 804 and/or CMOS functionality, may be on the same die, and the die may be one of multiple dies on a wafer. In various embodiments, the testing discussed herein may be performed prior to singulation. Particularly, the integrated system, e.g. die, may by acoustically enclosed with a small surrounding cavity, i.e. enclosure 806. For wafer-level testing, multiple enclosures are provided in the form of a top wafer, which is then carefully aligned to the wafer under test, and then pressed against it. By doing so, multiple of the dies under test may each be acoustically isolated from each other, and the test below may be performed, again prior to singulation. In some embodiments, multiple micro-speaker plus microphone dies can be tested in parallel, and the CMOS circuitry in each respective die may report a pass/fail condition, provide frequency response characteristics, or the like. Accordingly, the enclosures as described in this invention can be applied at a complete wafer level to test multiple dies in parallel thereby reducing the test time and test cost. In various embodiments, microphones 804 and speaker 802 also typically include bottom vent holes.

FIG. 8B illustrates a simplified embodiment where an signal 810 can be used to activate or drive the micro-speaker 812 to produce audible sound 814. In some examples, audible sound 814 may be in the audio band, which is about 20 Hz to about 20 KHz, may be outside the audio band, e.g. frequencies higher than 20 KHz, or the like. In some embodiments, the audio sound 814 such as, for example, a single frequency tone, is then captured by the microphone 804 and generates electrical signals 816 which can be detected by the integrated system. In some examples, the signal 810 is compared to signals 816 to determine responsiveness, frequency response, flat-band, and the like.

In a production environment or a pre-shipment die test, the micro-speaker or the microphones or both can be calibrated to measure sensitivity and other parameters of the speaker & microphone and the test data can be stored on a programmable non-volatile memory such as One time Programmable (OTP) or Electrically programmable non-volatile memory for usage by end consumers in the field.

In other embodiments, multiple MEMS speakers or MEMS microphones may be formed upon a common MEMS handle wafer, using the processes disclosed above. In some embodiments, one MEMS speaker may be optimized for one band of audio output (e.g. midrange), one MEMS speaker may be optimized for another band of audio output (e.g. bass), and the like. In some cases, frequency band directed/cross-over functionality may be implemented by active and/or passive devices formed within a CMOS wafer, within MEMS handle wafer, or via external devices, e.g. discrete passive capacitors, inductors, resistors, and the like disposed upon PCB 306, for example. Additionally, in still other embodiments, one or more MEMS microphones and one or more MEMS speakers may be formed monolithically as was illustrated in the figures above.

In some embodiments, biometric or other signal detection capability may be implemented. In some example, detection of vital signs may be performed by, the micro-speaker generating frequencies higher than audio band (e.g. >20K) and the microphone can be used to detect the response which is correlated to certain vital sign monitors. In some embodiments, MEMS microphones may be more generally termed MEMS sensors. In various embodiments, these MEMS sensors may receive signals within the audio frequency range, thus be called microphones, and in other embodiments, these MEMS sensors may receive and detect signals outside the audio band, such detection of signals below 20 Hz may be a pressure sensor, and detection of signals above 20 KHz may be an ultrasonic sensor, or the like. Accordingly, it should be understood that in embodiments where the term MEMS Microphone or the like is used herein, it may also refer to the term MEMS Sensor.

In some embodiments, processing of received and output audio signals may be performed by CMOS circuitry. As discussed above, the CMOS circuitry may be formed on a CMOS die that includes the speaker or microphones described above, or may be on a CMOS die that is separate substrate, but may be co-located upon a single package, or the like. In some embodiments, the CMOS circuitry may receive audio signals from a microphone and provide feedback noise cancellation for the micro speaker device; the CMOS circuitry may receive audio signals from a microphone and adjust the gain for certain frequencies to thereby reduce harmonic distortion for the micro speaker device; the CMOS circuitry may receive audio signals from a microphone to provide feedforward noise cancellation for the micro speaker device; and the like. In other embodiments, the CMOS circuitry may add time delays to various portions of an incoming signal for the micro speaker device to thereby add soundstage distance, chorus, reverberation, echoes, spatial effects and placement, or the like; the CMOS circuitry may adjusting amplitudes of pre-determined frequencies to the incoming electrical signal to compensate for non-linear response of the micro speaker device; the CMOS circuitry may adjust adjusting amplitudes of specified frequencies to the incoming electrical signal to provide user-specified equalization for the micro speaker device; the CMOS circuitry may adjust phases of pre-determined frequencies to the incoming electrical signals to adjust timbre, localization, stereo width, reverberation, chorus, phasing, and the like for the micro speaker device. In light of the present disclosure, it is believed that one of ordinary skill in the art will understand how embodiments of the present invention may implement and incorporate the above techniques.

The block diagrams of the architecture and flow charts are grouped for ease of understanding. However, it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

I claim:

1. An audio system comprising:

a first semiconductor substrate and a second semiconductor substrate;

a micro speaker device disposed upon the first semiconductor substrate comprising:

a first movable diaphragm layer having a first position relative to the first semiconductor substrate, wherein the first movable diaphragm is configured to be moved to a second position relative to the first semiconductor substrate to thereby create a positive or negative air pressure in response to an electrostatic charge relative to a first electrode;

a first spring coupled to the first movable diaphragm layer and to the first semiconductor substrate, wherein the first spring is configured to provide a first restoring force to the first movable diaphragm layer when the first movable diaphragm is in the second position relative to the first semiconductor substrate; and a first encapsulation layer comprising a first cavity disposed above the first movable diaphragm and a first vent hole, wherein the first vent hole is configured to allow the positive or negative air pressure to escape the first cavity;

one or more microphone devices disposed upon the second semiconductor substrate, wherein a first microphone device comprising:

a second movable diaphragm layer having a third position relative to the second semiconductor substrate, wherein the second movable diaphragm is configured to be moved to a fourth position relative to the second semiconductor substrate in response to a first received sound pressure;

a second spring coupled to the second movable diaphragm layer and to the second semiconductor substrate, wherein the second spring is configured to provide a second restoring force to the second movable diaphragm layer when the second movable diaphragm is in the third position relative to the second semiconductor substrate;

a second electrode disposed upon the second semiconductor substrate, wherein a first microphone capacitance is formed between the second electrode and the second movable diaphragm layer; and a second encapsulation layer comprising a second cavity disposed above the second movable diaphragm and a second vent hole, wherein the second vent hole is configured to allow the first received sound pressure to enter the second cavity.

2. The system of claim 1, wherein a first electrical signal in the form of voltage or charge is applied to the first movable diaphragm or to the first electrode of the micro speaker device to thereby create a sound wave.

3. The system of claim 1 wherein the first received sound pressure of the first microphone device comprises at least a portion of the positive or negative air pressure of the micro speaker device.

4. The system of claim 1 wherein the first microphone capacitance comprises a first capacitance when the second movable diaphragm layer is in the third position;

wherein the first microphone capacitance comprises a second capacitance when the second movable diaphragm layer is in the fourth position; and wherein the first capacitance and the second capacitance are different.

5. The system of claim 1 further comprising:

a second microphone device comprising:

a third movable diaphragm layer having a fifth position relative to the semiconductor substrate, wherein the third movable diaphragm is configured to be moved to a sixth position relative to the semiconductor substrate in response to a second received sound pressure;

a third spring coupled to the third movable diaphragm layer and to the semiconductor substrate, wherein the third spring is configured to provide a third restoring force to the third movable diaphragm layer when the third movable diaphragm is in the sixth position relative to the semiconductor substrate;

a third electrode disposed upon the semiconductor substrate, wherein a second microphone capacitance is formed between the third electrode and the third movable diaphragm layer; and a third encapsulation layer comprising a third cavity disposed above the third movable diaphragm and a third vent hole, wherein the third vent hole is configured to allow the first received sound pressure to enter the third cavity;

wherein the first microphone device is configured to receive the first received sound pressure in response to the system receiving an incoming sound pressure; and wherein the second microphone device is configured to receive the second received sound pressure in response to the system receiving the incoming sound pressure.

6. The system of claim 2 further comprising a third semiconductor substrate comprising a plurality of CMOS circuitry configured to generate the first electrical signal.

7. The system of claim 6 wherein the third semiconductor substrate is configured to receive an incoming electrical signal;

wherein a second electrical signal in the form of voltage or charge is determined in response the second capacitance;

wherein the plurality of CMOS circuitry are configured to generate the first electrical signal in response to the incoming electrical signal, to the second electrical signal, and to a modification function; and wherein the plurality of CMOS circuitry is configured to perform the modification function from a group consisting of: providing feedback noise cancellation for the micro speaker device, reducing harmonic distortion for the micro speaker device, and providing feedforward noise cancellation for the micro speaker device.

8. The system of claim 6 wherein the third semiconductor substrate is configured to receive an incoming electrical signal;

wherein the plurality of CMOS circuitry are configured to generate the first electrical signal in response to the incoming electrical signal and to a modification function; and wherein the plurality of CMOS circuitry is configured to perform the modification function selected from a group consisting of: adding time delays to the incoming electrical signal, adjusting amplitudes of pre-determined frequencies to the incoming electrical signal, adjusting amplitudes of specified frequencies to the incoming electrical signal, adjusting phases of pre-determined frequencies to the incoming electrical signal.

9. The system of claim 1 further comprising:

a third semiconductor substrate comprising a plurality of CMOS circuitry configured to generate the first electrical signal;

a packaging substrate, wherein the first semiconductor substrate and the third semiconductor substrate are disposed upon the packing substrate; and a packing enclosure enclosing the first semiconductor substrate and the third semiconductor substrate above the packaging substrate.

10. The system of claim 1 wherein the first semiconductor substrate the second semiconductor substrate are on a common substrate.

11. The system of claim 1 wherein a microphone device is configured to be disposed within an ear canal of a user and is configured to receive the first received sound pressure from within the ear canal.

12. The system of claim 11 wherein a second microphone device is configured to receive a sound pressure external to the ear canal.

13. A system comprising:

a plurality of microphone devices spatially disposed on a first substrate with a movable diaphragm layer connected to at least one spring and an encapsulation layer that forms a top layer over the movable diaphragm layer, the top layer having a cavity with an opening vent and operably coupled with a sound pressure to the movable diaphragm and a sense electrode on the first substrate, the sense electrode configured from a conductive layer selected from a group consisting of: a metal layer, a silicon material layer, and a poly silicon layer, to create a first capacitor device between the diaphragm layer and the first substrate; and a CMOS substrate coupled to the first substrate and configured to process a signal captured from the plurality of microphone devices.

14. A system of claim 13 where a sense electrode on an inner surface of a cap layer or the cap layer are configured to create a second capacitor between the movable diaphragm layer and the cap layer to sense sound pressure.

15. The system of claim 13 wherein the signal from the capacitance between the movable diaphragm layer and the cap layer is differentially processed with a signal from a capacitance between the movable diaphragm layer and the CMOS substrate to measure a microphone signal.

16. The system of claim 13 wherein the plurality of microphone devices have a vent opening and an additional microphone device is configured without a vent opening and is configured as a reference capacitor for calibration or compensation.

17. The system of claim 13 further comprising:

a micro speaker on a second substrate with another movable diaphragm layer connected to at least another spring and another encapsulation layer that forms another top layer over the other movable diaphragm layer, the other top layer having another cavity with another opening vent and operably coupled to generate sound pressure in response to a signal applied between the other movable diaphragm and a driving electrode on the second substrate, the driving electrode configured from the conductive layer; and wherein the CMOS substrate is coupled to the second substrate, wherein the CMOS substrate is to process a signal to drive the micro-speaker and wherein the CMOS substrate is configured to process the signal captured from the plurality of microphone devices.

18. Thes system of claim 17 wherein the first substrate and the second substrate are on a common substrate; and wherein the first substrate, the second substrate and the CMOS substrate are disposed upon a packaging substrate.

19. The system of claim 13 wherein a first microphone device from the plurality of microphone devices is configured to be disposed within an ear canal of a user and is configured to measure intensity of sound within the ear canal.

20. The system of claim 19 wherein a second microphone device from the plurality of microphone devices are configured to measure intensity of sound external from the ear canal.

* * * * *